United States Patent [19]

Frankenfeld et al.

[11] Patent Number: 5,068,094

[45] Date of Patent: Nov. 26, 1991

[54] PROCESS FOR THE REMOVAL OF CADMIUM IONS FROM PHOSPHORIC ACID RESULTING FROM A WET PROCESS

[75] Inventors: Klaus Frankenfeld, Hünfelden; Klaus Beltz, Budenheim; Gerhard Eich, Ingelheim; Klaus Endrich, Mainz-Finthen, all of Fed. Rep. of Germany

[73] Assignee: Chemische Fabrik Budenheim Rudolf A. Oetker, Budenheim, Fed. Rep. of Germany

[21] Appl. No.: 529,193

[22] Filed: May 25, 1990

[30] Foreign Application Priority Data

May 26, 1989 [DE] Fed. Rep. of Germany ....... 3917189

[51] Int. Cl.$^5$ ............................................. C01G 55/00
[52] U.S. Cl. ...................................... 423/109; 75/722; 75/743
[58] Field of Search ................... 75/722, 743; 423/109

[56] References Cited

U.S. PATENT DOCUMENTS

| | | | |
|---|---|---|---|
| 3,258,307 | 6/1966 | George | 23/61 |
| 3,458,282 | 7/1969 | Koerner et al. | 23/165 |
| 3,558,288 | 1/1971 | Burrows | 75/722 |
| 4,012,481 | 3/1977 | Baltz | 75/722 |
| 4,492,680 | 1/1985 | Frankenfeld et al. | 423/321 |

OTHER PUBLICATIONS

A. Alian et al., Solvent Extraction Studies on Cadmium, 750515 I.

A. Alain et al., Solvent Extraction Studies on Cadmium, 750523 II.

*Primary Examiner*—Peter D. Rosenberg
*Attorney, Agent, or Firm*—Horst M. Kasper

[57] ABSTRACT

A process for the removal of cadmium ions by liquid-liquid extraction from wet process phosphoric acid, which had been obtained from crude phosphate ores by dissolution with sulfuric acid, uses salts of long chain alkyl amines or ammonium bases with the chlorocomplexes of polyvalent metal ions, which are dissolved in an inert organic solvent.

62 Claims, No Drawings

PROCESS FOR THE REMOVAL OF CADMIUM IONS FROM PHOSPHORIC ACID RESULTING FROM A WET PROCESS

BACKGROUND OF THE INVENTION

1. Field of the Invention

The present invention describes a process for the removal of cadmium ions from phosphoric acid resulting from a wet process, in the following designated as "wet process phosphoric acid", preferably wet process phosphoric acid, obtained by dissolution of crude phosphate ores with sulfuric acid, said process being carried out by a liquid-liquid extraction using salts of alkyl amines or ammonium bases with anionic chlorocomplexes of polyvalent metal ions, which are dissolved in an inert organic solvent.

2. Brief Description of the Background of the Invention Including Prior Art

Cadmium belongs to the heavy metals whose spread is to be avoided. Crude phosphate ores used in the preparations of phosphate-containing fertilizers contain cadmium. By dressing the crude phosphate with sulfuric acid, said cadmium in the form of an easily soluble salt enters the produced phosphoric acid, and when the latter is further processed into fertilizers, it also enters into the same.

There are differences in cadmium contents of the various crude phosphate ores. The attempts have been numerous to reduce the cadmium content of crude phosphoric acids which have been prepared from crude phosphate ores having a high cadmium content.

However, the removal of cadmium from a crude phosphoric acid involves considerable difficulties. Cadmium salts are characterized by a very good solubility, in particular in acids of higher concentration.

Usually, cadmium is precipitated from weakly acidic aqueous solutions as a difficultly soluble sulfide by treatment with hydrogen sulfide.

According to German Patent Application Laid Open DE-OS 2,422,902, it is possible to precipitate cadmium from phosphoric acids of higher concentration and having a $P_2O_5$ content of more than 45 weight-percent under an excess pressure of up to 50 at and with a residence time of up to 3 hours. The examples of said German Application Laid Open show that, after completion of said treatment, about 10 to 20 percent of the originally present cadmium still remain in the acid. Therefore said process leads to a reduction of the cadmium content but not to an essentially complete removal of cadmium from the phosphoric acid.

Furthermore, it is possible to remove cadmium from crude phosphoric acids by extraction with organic solvents. The multitude of known purification processes of crude phosphoric acids show technical routes for this. In said process, a pure phosphoric acid is obtained in which all other cations, besides cadmium, are also largely removed from the phosphoric acid. In their purity, the acids are comparable to thermal phosphoric acid. By the high quality requirements, said processes, however, are cumbersome and extremely cost-intensive. For reasons of price, the thus obtained pure acids may, in general, not be used for the preparation of fertilizers.

British Patent GB-PS 1,053,929 describes a process for the removal of iron from phosphoric acid with the aid of primary, secondary, or tertiary amines which are dissolved in a hydrocarbon solvent. Phosphoric acid solutions, obtained by dressing phosphate ores with HCl, are subjected to said process, the iron being removed in the form of an anionic chlorocomplex.

The German Patent Application Laid Open DE-OS 3,218,599 describes an extraction procedure for the removal of cadmium from acidic, especially $P_2O_5$-containing solutions. As extractant, amine salts of hydrogen halide acids, in particular of hydrochloric acid, which are dissolved in an organic solvent, are used. As re-extractant, water or aqueous solutions of salts of oxyacids, in particular of ammonium salts of oxyacids, in the pH range between weakly acidic and neutral are used.

Said process is operated as multistage countercurrent extraction procedure. For the extraction stage, usually four countercurrent extraction units, and for the re-extraction stage, three countercurrent extraction units are necessary. For the preparation of the reagents, two further extraction units are required. The great number of necessary extraction units therefore leads to a high technical expenditure together with high investment costs.

SUMMARY OF THE INVENTION

1. Purposes of the Invention

It is the object of the present invention to provide an improved process for the removal of cadmium ions from wet process phosphoric acid which may be effected in a technologically simpler manner and with more favorable costs than the formerly known processes.

It is a further object of the present invention to remove the present cadmium directly and as selectively as possible from wet process phosphoric acid having a concentration of $P_2O_5$ of preferably about 28 to about 58 weight-percent without essentially changing the degree of quality, especially the content and composition of other substances accompanying the wet process phosphoric acid.

It is yet a further object of the invention that, after completion of the extraction, the overall content of metal cations in the phosphoric acid shall preferably differ from the overall content of cations before the extraction by less than 10 percent, and preferably less than 5 percent.

It is still a further object of the invention that, in contrast to the above, the extraction shall result in the removal of preferably at least 90 percent, and in particular in at least 95 percent, of the originally present cadmium ions.

These and other objects and advantages of the present invention will become evident from the description which follows.

2. Brief Description of the Invention

It has now been found that the above object may be achieved in a highly satisfying manner by the use of salts which are composed of anionic chlorocomplexes of polyvalent metals and cations derived from organic amines and quaternary ammonium bases, respectively.

Surprisingly, salts present in an inert organic solvent and dissolved therein and composed of organic amine cations and quaternary ammonium bases, respectively, which salts, as counter-ions, contain anionic chlorocomplexes of polyvalent metals different from cadmium, have the property of highly enhancing the essentially selective extraction of cadmium ions from wet process phosphoric acids, the cadmium remaining in the organic solvent phase in the form of an anionic chlorocomplex.

Furthermore, it was surprisingly found that the resulting cadmium complex salts of amines or quaternary ammonium bases, dissolved in an inert organic solvent, by treatment of the organic phase with an acidic aqueous solution, containing anionic chlorocomplexes of polyvalent metals, are exchanged by the latter, preferably those of zinc(II) and iron(III), and that cadmium is thereby transferred into the acidic aqueous solution.

This surprising property of the cadmium in the form of an anionic chlorocomplex salt with organic amine cations or quaternary ammonium bases during the extraction may be utilized for the provision of a simple liquid-liquid extraction process to remove cadmium ions from wet process phosphoric acid, which, for its continuous operation, merely requires one extraction and one re-extraction stage, a fact which apparently is of considerable economic and technical advantage.

Surprisingly, it was finally found that the chemical substances required for the extraction and re-extraction stages may be recovered from the resulting, cadmium-enriched aqueous re-extraction solution by suitable treatment thereof without addition of further chemicals. The cadmium precipitates in the form of an easily removable solid so that the extraction process of the invention, on the one hand, may be carried out with minimum consumption of chemicals and, on the other hand, furnishes the removed cadmium in a form which may be disposed without problems.

The novel features which are considered as characteristic for the invention are set forth in the appended claims. The invention itself, however, both as to its method of operation, its products and physical requirements, together with additional objects and advantages thereof, will be best understood from the following description of specific embodiments and examples.

DESCRIPTION OF INVENTION AND PREFERRED EMBODIMENT

Subject-matter of the present invention is therefore a process for the removal of cadmium ions from wet process phosphoric acid by liquid-liquid extraction in which the wet process phosphoric acid is contacted with at least one salt present in an organic solvent which is immiscible with water, aqueous salt solutions, and aqueous acids. Said salt is selected from salts of organic primary, secondary, and tertiary amines and quaternary ammonium salts. The organic solvent phase, containing the extracted cadmium ions, is separated from the wet process phosphoric acid and then the extracted cadmium ions, if desired, are reextracted from the isolated organic phase with an acidic aqueous solution, if desired, with subsequent processing of the resulting acidic aqueous reextract solution enriched in cadmium ions. The above amine and ammonium salts, respectively, are those containing chlorocomplexes of one or more polyvalent metals different from cadmium as anions.

According to a particularly preferred embodiment of the process of the invention, the organic solvent phase, removed from the wet process phosphoric acid and containing the extracted cadmium ions, is treated with an acidic aqueous solution containing anionic chlorocomplexes of one or several polyvalent metals different from cadmium in order to re-extract the cadmium ions from the isolated organic phase by replacing the anionic cadmium chlorocomplex from the organic phase with the aid of the chlorocomplexes of polyvalent metals different from cadmium. After re-extraction, the organic phase, which is then enriched with chlorocomplexes of polyvalent metals different from cadmium, may be returned to the extraction process, while the resulting aqueous phase is worked up preferably in a manner described in detail below.

The extraction process of the invention is particularly suitable for wet process phosphoric acids which have been prepared from crude phosphates by dissolution with sulfuric acid. Said process is little suited for phosphoric acids obtained by dissolution using hydrochloric or nitric acids and still containing chlorides or nitrates as essential components. By "essential component," there is understood a nitrate content of more than about 2 weight-percent, and in particular more than about 1 weight-percent, and a chloride content of more than about 2 weight-percent, and in particular more than about 1 weight-percent.

Wet process phosphoric acids, obtained by dissolution with sulfuric acid, to a minor degree may also contain chloride ions which originate from the phosphate ores or the chloride content of the process water. The chloride content is furthermore dependent on the $P_2O_5$ concentration because, when concentrating the filter acid, HCl is removed from the phosphoric acid as highly volatile component. The chloride content of such acid generally is in the range of 0.005 to 0.3 weight-percent and is neither interfering with nor favorable for the process of the invention. The sulfuric acid or the soluble sulfate ions, present in the wet process acid, do not impair the process of the present invention.

Thus, the organic nitrogen compounds suitable according to the invention for the preparation of the above-mentioned salts preferably have hydrocarbon radicals of 1 to 30, especially 1 to 18, carbon atoms. When using the secondary and tertiary amines and quaternary ammonium bases, respectively, which are preferred, the hydrocarbon radicals may be the same or different. It is particularly preferred that at least one of the hydrocarbon radicals, attached to the nitrogen atom, contains at least 6, and especially at least 8, carbon atoms. The hydrocarbon radicals preferably are aralkyl groups and/or alkyl groups, the latter being particularly preferred. Examples of hydrocarbons with longer chains, which may be attached to the nitrogen atom, are in particular octyl, nonyl, decyl, undecyl, tetradecyl, hexadecyl, and octadecyl, as well as benzyl.

Among the quaternary ammonium bases, especially those are preferred which carry three alkyl radicals, each having 8 to 10 carbon atoms, and a methyl group as fourth alkyl radical.

The primary, secondary, and tertiary amines, as well as the quaternary ammonium bases are prepared as commercial chemicals by various manufacturers and are commercially available under various product designations.

Concrete examples of amines and ammonium salts suitable according to the invention are the following:

dioctyl amine, diisooctyl amine, dinonyl amine, di-n-decyl amine, diisodecyl amine, di-n-undecyl amine, di-n-dodecyl amine, di(2-butyloctyl)-amine, di(1-isobutyl-3,5-dimethylhexyl)-amine, tri-n-octyl amine, triisooctyl amine, methyl dioctyl amine, tri-n-nonyl amine, N-butyl-N,N-di-n-dodecyl amine, N,N-dimethyl-N-octadecyl amine, tri-tetradecyl amine, tri-hexadecyl amine, tribenzyl amine, tri-n-octylmethyl ammonium chloride, tri-isooctyl methyl ammonium chloride, tri-n-nonylmethyl ammonium chloride, tri-isononyl methyl ammonium chloride, tri-n-decylmethyl ammonium chloride, and tri-n-dodecylmethyl ammonium chloride.

For the preparation of the salt used according to the invention, of course, also mixtures of two or more of the above amines and quaternary ammonium salts may be used.

In the salts used according to the invention, the anionic chlorocomplexes may comprise various polyvalent metals. In principle, all elements are suitable which are capable of forming chlorocomplexes in acidic aqueous systems. For this, the elements zinc, copper, cobalt, lead, iron, gold, ruthenium, palladium, platinum, and osmium are suitable, with the chlorocomplexes of iron, zinc, and copper being preferred according to the invention.

Wet process phosphoric acids are systems of multisubstances. They contain all anions and cations from the crude phosphates on which they are based which, after dissolution with sulfuric acid, are present in the phosphoric acid in the form of soluble compounds.

For the formation of the chlorocomplex, only such metals are preferred in the process of the invention which are present already in the wet process phosphoric acid as subsidiary components in significant concentrations, i.e. the elements zinc and iron. Thus, during the extraction of the cadmium ions from the wet process phosphoric acid, a modification of the composition of substances of the treated phosphoric acid due to the exchange of cadmium in the anionic chlorocomplex by the polyvalent metal ion is largely avoided.

Based on the cadmium content, other metal ions are present in the crude phosphoric acid in the order of magnitude of about the 1000-fold quantity. Therefore, it is totally unexpected that the extraction of the cadmium proceeds without failure and essentially in a selective manner in the presence of such an excess of the varying metal ions.

Additionally, the selectivity of the extraction of cadmium ions from wet process phosphoric acid may still be enhanced by using an organic solvent phase which contains a mixture of salts of the zinc-II-chlorocomplex and the iron-III-chlorocomplex with the above secondary and/or tertiary amines and/or quaternary ammonium bases.

Among the metal ions, present in the wet process phosphoric acid, only cadmium and zinc ions are able to displace the polyvalent metal ions from the chlorocomplex salts existing in the organic phase, especially from the iron-III-chlorocomplex, while they themselves remain in the organic solvent phase. When using a mixture of the salts of the zinc-II-chlorocomplex and the iron-III-chlorocomplex, the organic solvent phase is so much enriched with zinc and iron ions that merely cadmium ions may still be extracted from the wet process phosphoric acid so that the quantitative composition with respect to the elements zinc and iron is altered by the extraction process only as far as this is due to the extracted quantity of cadmium.

As solvents for the process of the invention, in principle, all organic solvents are suitable which are immiscible with water, aqueous acidic salt solutions, or with aqueous concentrated acids and do not react with them as long as they have a sufficient solubility for the chlorocomplex metal salts used according to the invention.

Taking into consideration said selection criteria, aliphatic hydrocarbons, aromatic hydrocarbons, and halohydrocarbons or their mixtures are preferred as organic solvents according to the invention. Of course, said solvents have to be liquid under the conditions of pressure and temperature used in the extraction process of the invention, and they should not show too high a vapor pressure. Examples of particularly preferred organic solvents are toluene, xylene, aliphatic hydrocarbon fractions having a suitable range of boiling points, mixtures or blends of aromatic as well as aromatic and aliphatic hydrocarbons, chloroform, and trichloroethylene as well as mixtures of the just mentioned solvents. To keep the loss of solvent as low as possible, solvents and solvent mixtures, respectively, having a boiling point of more than 100° C. are preferred.

The acidic aqueous solution containing the chlorocomplex of the polyvalent metals, preferably iron and/or zinc, as free acid, suitably has an overall chloride content of about 2 to about 58 weight-percent, and preferably about 3 to about 40 weight-percent. The overall content of free hydrochloric acid is preferably about 2 to about 32 weight-percent. The chloride portions, resulting from the difference between overall chloride and hydrochloric acid, are present in a form bound to polyvalent metal ions and alkali ions.

The acidic aqueous solution containing the iron-III-chlorocomplex but no zinc-II-chlorocomplex preferably shows an iron content in the range of about 0.01 to about 24 weight-percent, and especially 0.05 to 10 weight-percent. Particularly preferred in this case is an iron content of 0.1 to 5 weight-percent.

The acidic aqueous solution, containing the zinc-II-chlorocomplex but no iron-III-chlorocomplex, preferably shows a zinc content in the range of about 0.01 to 38 weight-percent, and especially 0.05 to 10 weight-percent. Particularly preferred in this case is a zinc content of 0.1 to 5 weight-percent.

The acidic aqueous solution, containing the iron-III-chlorocomplex as well as the zinc-II-chlorocomplex, preferably has an iron content of 0.01 to 8.0 weight-percent, and particularly preferred are 0.05 to 4 weight-percent, and a zinc content of 0.01 to 8.0 weight-percent, and particularly preferred are 0.05 to 4 weight-percent %.

In the process of the invention, the acidic aqueous solution generally has a double function. First, it serves for the reextraction of the cadmium-chlorocomplex from the cadmium-enriched organic phase and, secondly, it is used according to the invention for the formation of the salts from amines or quaternary ammonium bases and chlorocomplexes of a polyvalent metal. According to the invention, both functions may be carried out simultaneously by effecting the exchange of the anionic chlorocomplex with the amine or quaternary ammonium cations as a liquid-liquid extraction process.

As a rule, the organic phase is primarily prepared by dissolving the above amines or quaternary ammonium bases in the suitable organic solvents and by post-treatment of the organic solution with the acidic aqueous solution in the form of a one-stage extraction process. In the continuous operation of the process according to the invention, there is a permanent formation of the salts used according to the invention by contacting the organic phase with the acidic aqueous solution.

The concentration of salts used according to the invention in the organic phase is defined by the amount of dissolved amine and/or quaternary ammonium base. The salt concentration results from the reaction of the base equivalents with the acid equivalents of the chlorocomplex of the polyvalent metals.

Preferably the process of the invention is operated with organic solutions in which the amine and/or the quaternary ammonium base is present in a concentration in the range of 0.1 to 10 weight-percent, and preferably 0.2 to 5.0 weight-percent.

In the preparation of organic solutions, having a higher salt concentration, it is recommended, especially when using unpolar organic solvents, to add minor amounts of a solubilizing agent to the organic solution. As solubilizing agent, e.g. long chain alcohols, preferably those with at least 8 carbon atoms, may be employed. The amount of solubilizing agent to be used may be easily determined by tests in each particular case.

The process of the invention is preferably effected at a temperature in the range of 15° to 25° C. However, one may also operate without restrictions at higher temperatures, e.g. in a range of up to 80° C. The upper temperature limit is determined by the type of organic solvent and its vapor pressure, compared to the external pressure. The lower temperature limit is determined by the viscosity property of the two liquid phases. A high increase of viscosity impairs the mixing and separation of phases and may result in the failure of the extraction process.

The process of the invention is preferably carried out at normal pressure, however, one may also operate at reduced or at excess pressure.

Furthermore, the process of the invention may be carried out batchwise as well as continuously. On a commercial scale, the process is preferably carried out continuously. The extraction apparatus necessary for this essentially consists of an extraction and reextraction unit which are usually operated in one step in the form of mixers-settlers. Both extraction units are interconnected by pipes and pumps for the circulation of the organic phase.

In this context, the preparation of the salts, used according to the invention in the organic solvent phase, is carried out in the reextraction unit by treating the organic phase with the acidic aqueous solution. The separated solvent phase is, if desired via a buffering vessel, returned to the extraction unit.

The treatment of the cadmium-containing crude acid in the extraction unit is preferably effected by intensive mixing with the introduced solvent phase. After phase separation, the cadmium-enriched wet process acid is removed from the continuous process.

Then the cadmium-containing solvent phase is preferably directed to the reextraction unit and subjected to a treatment with the acidic aqueous solution containing the chlorocomplex of a polyvalent metal, whereby the anionic chlorocomplex of the cadmium migrates into the aqueous phase and the anionic chlorocomplex of the polyvalent metal migrates into the organic phase. The organic solvent phase is recycled to the extraction unit. The removed acidic aqueous solution, containing the reextracted cadmium, may then be sent to the disposal or worked up to defined cadmium compounds. Preferably, however, said solution is then further processed according to the particularly advantageous method illustrated in detail below.

The extraction process of the invention is preferably carried out under conditions which guarantee a maximum depletion of cadmium from the wet process phosphoric acid and a maximum enrichment of extracted cadmium in the removed acidic aqueous solution.

In the extraction of cadmium from phosphoric acid, the weight ratios of organic phase to acid phase are preferably in the range of 1:1 to 1:10. The most favorable ratio of phases under the respective prevailing conditions is determined by the cadmium content of the phosphoric acid, the desired degree of depletion, and the concentration of salts used according to the invention in the organic phase.

In the reextraction of cadmium from the organic phase preferred according to the invention, the weight ratios of organic phase to acidic aqueous solution are preferably in the range of 1:10 to 10:1. In this case, the optimum phase ratio is dependent on the concentration of salts in the organic phase and the concentration of chlorocomplexes of polyvalent metals in the acidic aqueous solution.

In the above described extraction and reextraction process, an acidic aqueous solution enriched with cadmium (occasionally designated as "reextract" or "reextract solution" in the following) is obtained as a waste stream. This solution contains hydrochloric acid, heavy metals (Cd, Fe, Zn, etc.), and ions of phosphate and chloride as essential components. Its composition is determined by the reextract itself as well as by the droplets of phosphoric acid entrained during the extraction. Depending on the conditions under which the cadmium extraction process is operated, the composition of the removed reextract stream varies, i.e. generally within the following ranges (in weight-percent):

| overall chloride | 13.0 to 19.0 |
| hydrochloric acid | 5.0 to 16.0 |
| $P_2O_5$ | 1.0 to 12.0 |
| iron | 0.02 to 0.4 |
| zinc | 0.5 to 1.5 |
| cadmium | 0.05 to 0.25 |

This acidic aqueous solution actually cannot be disposed of by neutralization and precipitation methods of the prior art: The content of free hydrochloric acid and phosphoric acid requires an extremely large amount of neutralizing chemicals, and the content of heavy metals, in particular cadmium, requires the disposal of the obtained sludges in a high security deposit site.

The filtrate obtained by precipitation does not satisfy the severe requirements established in many countries with respect to the disposal of waste waters. The limiting values for the pH, zinc, and cadmium in waste water exclude a suitable conditioning of the waste water by mutual negative influences.

According to R. Weiner: "Die Abwässer in der Metallindustrie", Third Edition, page 144, the residual solubility of the major heavy metals involved is dependent on the pH in the following manner:

| pH of the precipitation | residual content of heavy metals (mg/l) | | |
| --- | --- | --- | --- |
| | Fe | Zn | Cd |
| 6.5 | 0.8 | 18.5 | 19.2 |
| 7.0 | 0.4 | 17.8 | 18.4 |
| 8.0 | 0 | 9.1 | 15.2 |
| 8.5 | 0 | 1.6 | 4.8 |
| 9.0 | 0 | 1.5 | 0.9 |
| 10.0 | 0 | 8.4 | 0 |

The listed values only apply to precipitations with sodium hydroxide in aqueous solutions having a hardness of 17.5° dH. The chloride content of the reextracts obtained according to the invention, which is generally high, additionally influences in a negative way the above shown residual solubility of the heavy metals.

At present the concentration limits for the introduction of waste water into the prekennel in the Federal Republic of Germany are set to the following values:

| pH | 6.5 to 8.5 |
|---|---|
| Fe | no data |
| Zn | 5 mg/l |
| Cd | 0.5 mg/l |

Thus, it results that, when maintaining the pH limits, only iron and zinc may be precipitated in a satisfying manner while cadmium remains in solution.

Cadmium may be quantitatively precipitated only at a pH value much in excess of the required maximum value, i.e. a value of 10 or more. At such high pH values, however, zinc is redissolved, and furthermore the high pH value anyway excludes the introduction of waste water into the prekennel.

On the whole, the amount of chemicals required for the neutralization and neutralization leads to a distinct increase of the waste-water quantity, i.e. generally the waste-water quantity increases, being many times higher than the amount of acidic aqueous solution to be disposed of. Additionally, the deposit site is burdened by an increased volume of material to be deposited.

Besides considerations concerning the environment, the disposal of the acidic aqueous solution containing ions of heavy metals and chloride is a highly cost-intensive procedure which is due to the required high amount of chemicals and the costs for the waste deposit.

The processing of the reextract by precipitation reactions with chemicals in a liquid system and the disposal of large volumes of sludges and waste-water streams, which both would place a heavy burden on the environment, may be eliminated according to the present invention by at least largely removing free hydrochloric acid from the reextract by physical separation procedures and, if desired, returning said acid to the extraction and/or reextraction stage, whereupon the remaining solution is concentrated and, if desired, cooled, the resulting cadmium-containing precipitate is removed and the filtrate, if desired, is added to the crude phosphoric acid which is to be subjected to a cadmium removal.

As the processing of the reextract is effected with physical methods, the use of any chemicals for the neutralization or precipitation of heavy metals is not necessary, and thus no waste water occurs. Because of these facts, the process according to the invention for the treatment of the reextract is extremely favorable for the environment.

The removal and recovery of the free hydrochloric acid is preferably done by distillation. The recovery of free hydrochloric acid is preferably in the range of 80 to 100. weight-percent, especially 95 to 100 weight-percent, based on the amount of the free hydrochloric acid originally present in the acidic aqueous reextract solution.

The distillation is applicable regardless of the composition of the reextract resulting, in connection with a rectification plant, in a constant stream of aqueous hydrochloric acid having an azeotropic composition of 20.17% of HCl/79.83% of $H_2O$ and a minor amount of water resulting from the rectification of the vapors. This satisfies an important proviso for the neutralization of the hydrochloric acid. The azeotropic distillation, together with a high recovery rate of hydrochloric acid, enables to greatly reduce the volume and to highly concentrate the reextract. Usually, the hydrochloric acid is driven off at a boiling range of 100° to 108° C.

Surprisingly, it has been found that, when concentrating the obtained reextract, a solid (usually in fine needle-shaped crystals) precipitates from the solution, which solid has a high content of cadmium and chloride. The precipitation of said solid occurs already at a boiling temperature of the solution in the range of 130° to 160° C.

Said temperature corresponds to a $P_2O_5$ concentration of 40 to 60%. Preferably, the solution is concentrated to a concentration of 45 to 57% of $P_2O_5$. For the formation of crystals, the concentration of chloride ions in the concentrated solution should be 0.5 to 8.0 weight-percent, and preferably 1.0 to 6.0 weight-percent. The precipitation of the cadmium-containing solid is completed when cooling the solution preferably to room temperature, i.e. about 20° C. The resulting precipitate may be removed from the concentrated solution, e.g. by filtration or decanting.

The behavior of cadmium just illustrated is surprising because, until now, it had not been known that cadmium crystallizes as chloride from a concentrated solution containing ions of phosphate and chloride. Said behavior is all the more surprising, as cadmium chloride is generally considered to belong to the very easily soluble compounds. Therefore, it was not to be expected that, in concentrated reextracts, cadmium crystallizes as chloride.

Furthermore, it had been unpredictable that, together with the precipitation of crystals, an almost complete removal of cadmium or its separation from other heavy metal ions, in particular Fe and Zn, in the concentrated reextract occurs. Zinc, which is also present in excess in the concentrated solution, in contrast to a basically comparable behavior of cadmium and zinc, shows no tendency to crystallize. Due to the crystallization of the cadmium salt, there is an almost complete separation of cadmium/zinc in the concentrated solution.

The following Table shows the residual solubility of cadmium in concentrated solution depending on the $P_2O_5$ concentrations, as established by experiments.

| $P_2O_5$ % | Cl % | overall-Cd % | % residual solubility of Cd | Cd depletion % |
|---|---|---|---|---|
| 42.3 | 6.0 | 0.56 | 0.010 | 98.2 |
| 46.3 | 5.0 | 0.61 | 0.009 | 98.5 |
| 50.0 | 4.0 | 0.52 | 0.006 | 98.8 |
| 54.6 | 3.1 | 0.47 | 0.004 | 99.1 |
| 57.1 | 2.2 | 0.54 | 0.002 | 99.6 |

As shown by the above Table, the process according to the invention achieves an almost complete removal of cadmium.

The surprising behavior of cadmium when concentrating acidic aqueous solutions, which are largely freed from hydrochloric acid but still contain ions of heavy metals, phosphate, and chloride, is decisive for an optimum processing of the reextract obtained in the extraction/reextraction process of the invention. The highly toxic heavy metal cadmium in a simply manner may be eliminated selectively and in concentrated form from the multi-substance mixture of the concentrated solution without necessitating the use of further chemicals, e.g. for neutralization and precipitation reactions.

The process described immediately above thus enables to remove the critical component cadmium from the reextract in a very simple manner which is highly favorable for the environment.

In practice, the above process for the treatment of the cadmium-enriched acidic aqueous reextract solutions is preferably carried out in a multistage, especially two-stage, distillation device consisting of a distillation still and a rectification column. The process may be carried out batchwise or continuously at normal pressure or under vacuum.

In a batchwise operation, the free hydrochloric acid is at least largely driven off from the acidic aqueous reextract in the first stage in a distillation still by heating. The necessary sump temperature is usually about 115° to 120° C. After removing the free hydrochloric acid, the temperature of the sump solution is slowly raised, preferably to values up to about 160° C., resulting in a suspension which consists of the concentrated solution and the precipitated Cd containing solid.

The $HCl/H_2O$ vapors leaving the distillation still are separated in the rectification part of the distillation device into the $H_2O$ mixture with constant boiling point showing 20.17% of HCl and into $H_2O$. The suspension remaining in the still is drained off, cooled preferably to normal temperature with stirring and filtered. The filtrate showing a minor residual content of Cd essentially consists of phosphoric acid which had been entrained into the reextract by the extraction process.

When processing the aqueous acidic reextract continuously the operation is basically the same. However, the distillation still is preferably a circulation evaporator. The temperature is adjusted to a value corresponding to the desired end concentration. The feed of the reextract to be processed is effected via temperature control in the circulation evaporator. All waste streams from the distillation are obtained continuously and are processed further basically in the same way as in the batchwise operation.

The amount of solid obtained depends on the cadmium content of the concentrated sump solution. In general, the concentrated sump solution has a solid content of 0.5 to 2.0 weight-percent. The isolation of the precipitate is suitably effected by filtration. Other methods of removal, such as decantation, may also be used. In spite of the high content of $P_2O_5$ and the high density, the filtration proceeds without problems because usually needle-shaped crystals are obtained which form a bulky, highly permeable filter cake.

The wet filter cake normally has a $CdCl_2$ content in the range of 30 to 60 weight-percent, which content is determined by the amount of adhering sump solution. The filter cake may be isolated and brought into a state ready for disposal without washing. It is also possible to use the filter cake as starting material showing a high percentage of Cd for a different purpose.

When the final disposal in a high security deposit is intended, the precipitate may, if desired by blending with calcium oxide, be transformed into a dry powdery end product having, as aqueous suspension, a pH of more than 10. The amount of CaO used for this purpose is usually 0.6 to 0.8 times the amount of cadmium-containing solid filtered off.

The distillates and streams of phosphoric acid obtained when effecting the reextract-treatment process of the invention may be recirculated as auxiliary and starting materials, respectively, into the Cd extraction/reextraction process from which the waste-stream results.

The obtained hydrochloric acid may be used, for example, to prepare a fresh reextract solution.

The cadmium-enriched filtrate, which essentially consists of concentrated phosphoric acid, may be added to the stream of crude phosphoric acid fed to the extraction process. The residual Cd content hardly influences the Cd balance of the extraction process because the recirculated amount generally is only 0.1 to 0.4% of the amount of wet process phosphoric acid which is treated in the Cd extraction process.

This processing method is particularly advantageous because the overall process may be carried out at extremely low costs due to the recirculation of the separated partial streams into the extraction/reextraction process. Chemicals are hardly needed, and costs essentially arise only from the energy required for distillation and concentration of the sump solution.

The following examples illustrate the present invention. Unless stated otherwise, all percentages are based on the weight.

EXAMPLE 1

A concentrated crude phosphoric acid, which had been prepared from Moroccan phosphate ore by dissolution with sulfuric acid, showed the following data of analysis:

| | |
|---|---|
| $P_2O_5$ | 55.5% |
| $SO_3$ | 1.10% |
| F | 0.35% |
| Cl | 0.003% |
| Mg | 0.42 |
| Ca | 0.036% |
| Zn | 0.043% |
| Cd | 0.0018% |
| Fe | 0.34% |
| Al | 0.39% |
| Cr | 0.041% |
| V | 0.045% |

The acid heated to 60° C. was extracted with an organic solvent phase consisting of

| | |
|---|---|
| aliphatic hydrocarbon, b.p. 204° C. | 97.5% |
| tridodecylamine-$H(FeCl_4)$salt | 2.0% |
| dodecanol | 0.5% | in a continuously operating one-stage mixer-settler device over a period of 80 hours in a phase ratio of 1:3 (parts by weight of organic phase/parts by weight of acid phase) in an amount of 45 kg/h of acid. The residence time in the mixer was 6 minutes, that in the settler 30 minutes.

After separation of the phases, the discharged phosphoric acid, from which cadmium had been removed, had the following composition:

| | |
|---|---|
| $P_2O_5$ | 55.4% |
| $SO_3$ | 1.10% |
| F | 0.35% |
| Cl | 0.02% |
| Mg | 0.42% |
| Ca | 0.036% |
| Zn | 0.029% |

| | |
|---|---|
| Cd | 0.00015% |
| Fe | 0.35% |
| Al | 0.39% |
| Cr | 0.041% |

The cadmium-containing organic solvent phase which was continuously withdrawn from the extraction unit was treated in a one-stage mixer-settler device in phase ratio of 10:1 (parts by weight of organic phase/parts by weight of aqueous phase) in an amount of 1.5 kg/h of an acidic aqueous solution.

The acidic aqueous solution had the composition:

| | |
|---|---|
| overall chloride | 17.0% |
| HCl | 7.5% |
| $Fe^{3+}$ | 1.8% |
| Na | 4.0% |
| $H_2O$ | 77.0% |

The mixture had a residence time of 12 minutes in the mixer and of 45 minutes in the settler.

After separation of the phases, the organic solvent phase, which had been treated with the iron-III-chlorocomplex, was recirculated into the extraction unit. The withdrawn acidic aqueous solution showed the following data of analysis:

| | |
|---|---|
| Cl | 16.4% |
| Fe | 1.4% |
| Zn | 0.41% |
| Cd | 0.049% |
| Na | 4.1% |
| $P_2O_5$ | 3.0% |
| $H_2O$ | 73.5% |

EXAMPLE 2

An identical crude phosphoric acid was treated to the same criteria as described in Example 1. Contrary to Example 1, however, the extraction of the crude phosphoric acid was carried out with an organic solvent phase in which the salts of the iron-III-chlorocomplex and the zinc-II-chlorocomplex with the tridodecylamine were dissolved. The organic solvent phase had the composition:

| | |
|---|---|
| aliphatic hydrocarbon, b.p. 140° C. | 98.1% |
| tridodecylamine-H($FeCl_4$) salt | 0.7% |
| tridodecylamine-$H_2$($ZnCl_4$) salt | 0.7% |
| dodecanol | 0.5% |

After separation of the phases, the discharged phosphoric acid from which cadmium had been removed had the composition:

| | |
|---|---|
| $P_2O_5$ | 55.4% |
| $SO_3$ | 1.10% |
| F | 0.35% |
| Cl | 0.02% |
| Mg | 0.42% |
| Ca | 0.036% |
| Zn | 0.04% |
| Cd | 0.00009% |
| Fe | 0.34% |
| Al | 0.39% |
| Cr | 0.041% |

| | |
|---|---|
| V | 0.045% |

The discharged cadmium-containing organic solvent phase was further treated as described in Example 1, but contrary to Example 1, the acidic aqueous solution had the composition:

| | |
|---|---|
| overall chloride | 17.0% |
| HCl | 3.5% |
| $Fe^{3+}$ | 1.0% |
| $Zn^{2+}$ | 1.2% |
| Na | 6.7% |
| $H_2O$ | 74.0% |

After separation of the phases, the organic solvent phase was recirculated into the extraction unit. The cadmium-containing acidic aqueous solution had the composition:

| | |
|---|---|
| Cl | 16.5% |
| Fe | 1.3% |
| Zn | 1.1% |
| Cd | 0.05% |
| Na | 6.8% |
| $P_2O_5$ | 2.9% |
| $H_2O$ | 72.1% |

EXAMPLE 3

A wet process phosphoric acid which had been prepared according to the hemihydrate procedure from Togo phosphate ore by dissolution with sulfuric acid had the data of analysis:

| | |
|---|---|
| $P_2O_5$ | 41.5% |
| $SO_3$ | 1.8% |
| F | 1.1% |
| Cl | 0.34% |
| Mg | 0.11% |
| Ca | 0.040% |
| Zn | 0.032% |
| Cd | 0.0042% |
| Fe | 0.95% |
| Al | 0.10% |
| Cr | 0.013% |
| V | 0.013% |

The crude acid at room temperature, 22° C., was continuously extracted with an organic solvent phase consisting of:

| | |
|---|---|
| aliphatic hydrocarbon, b.p. 140° C. | 96.6% |
| diisononyl-H($FeCl_4$) salt | 2.4% |
| dodecanol | 1.0% | in a one-stage mixer-settler device in a phase ratio of 1:2 (parts by weight or organic phase/parts by weight of acid phase). The amount of acid metered in was 45 kg/h. The residence time in the mixer was 5 minutes, in the settler 23 minutes.

After separation of the phases the crude acid from which cadmium had been removed showed the following data of analysis:

| | |
|---|---|
| $P_2O_5$ | 41.4% |
| $SO_3$ | 1.8% |

-continued

|  |  |
|---|---|
| F | 1.1% |
| Cl | 0.37% |
| Mg | 0.11% |
| Ca | 0.040% |
| Zn | 0.029% |
| Cd | 0.00012% |
| Fe | 0.098% |
| Al | 0.10% |
| Cr | 0.013% |
| V | 0.013% |

The cadmium-containing organic solvent phase was continuously extracted with an acidic aqueous solution in a mixer-settler unit in a phase ratio of 10:1 (parts by weight of organic phase/parts by weight of aqueous phase). The acidic aqueous solution had the composition:

|  |  |
|---|---|
| overall chloride: | 19.3% |
| HCl | 8.5% |
| $Fe^{3+}$ | 2.5% |
| Na | 4.0% |
| $H_2O$ | 74.0% |

The amount of acidic aqueous solution used was 2.25 kg/h. The residence time in the mixer was 10 minutes, in the settler 45 minutes.

After separation of the phases, the organic solvent phase was continuously recirculated into the extraction unit. The discharged cadmium-containing acidic aqueous solution had the composition:

|  |  |
|---|---|
| Cl | 18.7% |
| Fe | 2.0% |
| Zn | 0.06% |
| Cd | 0.082% |
| Na | 4.0% |
| $P_2O_5$ | 1.8% |
| $H_2O$ | 72.7% |

The test had an operation time of 32 hours.

EXAMPLE 42

A filter acid which had been prepared according to the wet process from Moroccan phosphate ore by dissolution with sulfuric acid had the following data of analysis:

|  |  |
|---|---|
| $P_2O_5$ | 29.8% |
| $SO_3$ | 2.2% |
| F | 2.8% |
| Cl | 0.063% |
| Mg | 0.34% |
| Ca | 0.10% |
| Zn | 0.025% |
| Cd | 0.0015% |
| Fe | 0.21% |
| Al | 0.26% |
| Cr | 0.020% |
| V | 0.021% |

The crude acid at 40° C. was continuously extracted with an organic solvent phase consisting of a 1.2% solution of trioctylmethyl-ammonium-$(FeCl_4)$ salt, dissolved in xylene, in a closed one-stage mixer-settler device. The amounts metered in were:

|  |  |
|---|---|
| crude acid | 2.0 kg/h |

-continued

|  |  |
|---|---|
| solvent phase | 0.4 kg/h |

The residence time in the mixer was 8 minutes, in the settler 40 minutes.

After separation of the phases the filter acid, from which cadmium had been removed, showed the following data of analysis:

|  |  |
|---|---|
| $P_2O_5$ | 29.7% |
| $SO_3$ | 2.2% |
| F | 2.8% |
| Cl | 0.079% |
| Mg | 0.34% |
| Ca | 0.10% |
| Zn | 0.033% |
| Cd | 0.00009% |
| Fe | 0.17% |
| Al | 0.26% |
| Cr | 0.020% |
| V | 0.021% |

The discharged cadmium-containing solvent phase was reextracted with an acidic aqueous solution showing the following data of analysis:

|  |  |
|---|---|
| overall chloride | 18.5% |
| HCl | 8.5% |
| Zn | 2.5% |
| Na | 4.9% |
| $H_2O$ | 73.9% | in a phase ratio of 10:1 (parts by weight or organic phase/parts by weight of aqueous phase) in a closed one-stage mixer-settler device. The residence time in said device was 30 minutes in the mixer, and 45 minutes in the After separation of the phases, the organic solvent phase was recirculated into the acid-extraction unit. The resulting cadmium-containing acidic aqueous solution had the composition:

|  |  |
|---|---|
| Cl | 17.6% |
| Zn | 2.1% |
| Cd | 0.070% |
| Na | 4.9% |
| $P_2O_5$ | 4.3% |
| $H_2O$ | 69.4% |

The operation time of the experiment was 7 hours.

The following examples refer to the processing of the acidic aqueous reextract obtainable according to the present invention.

EXAMPLE 5

In the cadmium removal by liquid-liquid extraction according to the present invention from a wet process phosphoric acid, which had been prepared from Moroccan crude phosphate and in the subsequent reextraction of the organic phase, 210 kg/h of a Cd containing aqueous reextract solution were obtained. The reextract had the following data of analysis:

|  |  |
|---|---|
| overall chloride | 14.1% |
| HCl | 13.7% |
| $P_2O_5$ | 8.5% |
| Fe | 0.15% |
| Zn | 1.04% |

| | |
|---|---|
| Cd | 0.11% |

The reextract stream was continuously severed in a two-stage distillation apparatus. The sump temperature in the circulation evaporator was 150° C., the $P_2O_5$ concentration was 51.1%.

During the distillation, the following amounts were continuously obtained:

| | |
|---|---|
| sump discharge | 34.1 kg/h |
| HCl/H$_2$ distillate | 142.6 kg/h |
| H$_2$O distillate | 33.3 kg/h |

The distillates were reused to prepare fresh reextraction solutions.

The sump discharge was continuously collected in a receiver and cooled to 20° C. accompanied by stirring. The separation of the precipitating $CdCl_2$-crystals was effected batchwise with the aid of a filter press. Before filtration, the sump suspension had the following data of analysis:

| | |
|---|---|
| $P_2O_5$ | 51.1% |
| Cl | 4.8% |
| Fe | 0.92% |
| Zn | 6.40% |
| Cd | 0.68% |

After filtration of the Cd precipitate, the sump solution had a residual Cd content of 56 ppm, the other analysis data remaining essentially unchanged. This corresponds to a Cd removal of 99.2%.

The proportional amount of the moist Cd precipitate filtered off was 0.80 kg/h. The $CdCl_2$-content in the precipitate was 46.9%.

The sump solution, freed from the precipitated Cd salt, was fed into the stream of wet process phosphoric acid to be subjected to the cadmium removal. The moist filtered Cd precipitate was thoroughly blended with 0.65 kg/h of caustic lime and transported to the deposit as a dry mixture.

EXAMPLE 6

In the cadmium removal by liquid-liquid extraction according to the present invention from a wet process phosphoric acid, prepared from West African crude phosphate, and in the subsequent reextraction of the organic phase, 149.0 kg/h of a Cd containing aqueous reextract solution were obtained. The reextract showed the following data of analysis:

| | |
|---|---|
| overall chloride | 14.0% |
| HCl | 13.8% |
| $P_2O_5$ | 4.60% |
| Fe | 0.20% |
| Zn | 0.60% |
| Cd | 0.21% |

The reextract stream was continuously separated in a two-stage distillation apparatus. The sump temperature in the circulation evaporator was 154° C., the $P_2O_5$ concentration was 53.6%.

During the distillation, the following amounts were continuously obtained:

| | |
|---|---|
| sump discharge | 12.8 kg/h |
| HCl/H$_2$O distillate | 101.9 kg/h |
| H$_2$O distillate | 34.3 kg/h |

The distillates were recirculated to the reextraction unit to prepare fresh reextract solution.

The continuously resulting sump was collected in a receiver and cooled to 20° C. accompanied by stirring. The removal of the resulting $CdCl_2$ precipitate was effected batchwise with the aid of a filter press. Before filtration the suspension showed the following data of analysis:

| | |
|---|---|
| $P_2O_5$ | 53.6% |
| Cl | 6.8% |
| Fe | 2.33% |
| Zn | 6.99% |
| Cd | 2.45% |

After filtration of the Cd precipitate, the sump solution showed the following data of analysis:

| | |
|---|---|
| $P_2O_5$ | 56.0% |
| Cl | 5.4% |
| Fe | 2.44% |
| Zn | 7.33% |
| Cd | 39 ppm |

From this a Cd removal of 99.8% may be calculated.

The proportional amount of filter-moist Cd precipitate filtered off was 0.87 kg/h. The $CdCl_2$ content was 59.0%. The sump solution, freed from the precipitated Cd salt, was fed into the stream of wet process acid. The filter-moist Cd precipitate was thoroughly mixed with 0.75 kg/h of caustic lime and transported to the deposit as a dry blend.

EXAMPLE 7

In the cadmium removal by liquid-liquid extraction according to the present invention from a wet process phosphoric acid, prepared from Togo crude phosphate and in the subsequent reextraction of the organic phase, 216.0 kg/h of a Cd containing aqueous reextract solution were continuously obtained. The reextract showed the following data of analysis:

| | |
|---|---|
| overall chloride | 13.0% |
| HCl | 12.6% |
| $P_2O_5$ | 11.9% |
| Fe | 0.17% |
| Zn | 1.13% |
| Cd | 0.22% |

The reextract stream was continuously separated in a two-stage distillation apparatus. The sump temperature in the circulation evaporator was 151° C., the $P_2O_5$ concentration was 54.6%.

During the distillation, the following quantitative streams were continuously obtained:

| | |
|---|---|
| sump discharge | 47.1 kg/h |
| HCl/H$_2$O distillate | 134.7 kg/h |
| H$_2$O distillate | 34.2 kg/h |

The distillates were used to prepare fresh reextract solution.

The concentrated sump solution was continuously collected in a receiver and cooled to 20° C., accompanied by stirring. The removal of precipitated $CdCl_2$ crystals was effected batchwise with the aid of a filter press. Before filtration, the suspension showed the following data of analysis:

| | |
|---|---|
| $P_2O_5$ | 54.6% |
| Cl | 3.50% |
| Fe | 0.78% |
| Zn | 5.18% |
| Cd | 1.01% |

After removal of the Cd precipitate, the analysis showed the following data:

| | |
|---|---|
| $P_2O_5$ | 55.9% |
| Cl | 2.93% |
| Fe | 0.80% |
| Zn | 5.30% |
| Cd | 49 ppm |

From this, a Cd removal of 99.5% may be calculated.

The proportional amount of the filter-moist precipitate filtered off was 1.12 kg/h. The $CdCl_2$-content was 42.3%. The sump solution, which had been freed from the precipitated Cd salt, was fed into the stream of crude phosphoric acid for extraction. The filter-moist precipitate was thoroughly blended with 1.0 kg/h of caustic lime and transported to the deposit as a dry blend.

EXAMPLE 8

In the cadmium removal by liquid-liquid extraction according to the present invention from wet process phosphoric acid, prepared from calcinated North-Carolina crude phosphate and in the subsequent reextraction of the organic phase, 264 kg/h of a Cd containing reextract stream were obtained showing the following data of analysis:

| | |
|---|---|
| overall chloride | 13.5% |
| HCl | 13.5% |
| $P_2O_5$ | 4.90% |
| Fe | 0.13% |
| Zn | 1.50% |
| Cd | 0.20% |

The aqueous reextract stream was continuously severed in a two-stage distillation apparatus. The sump temperature in the circulation evaporator was 147° C., and the $P_2O_5$ concentration was 50.8%.

During the distillation, the following streams were continuously obtained:

| | |
|---|---|
| sump discharge | 25.5 kg/h |
| $HCl/H_2O$ distillate | 174.1 kg/h |
| $H_2O$ distillate | 64.4 kg/h |

The distillates were used to prepare fresh reextract solution.

The continuously obtained sump solution was collected in a receiver and cooled to about 20° C. accompanied by stirring. The removal of the resulting $CdCl_2$ precipitate was effected batchwise with the aid of a filter press. Before filtration, the suspension showed the following data of analysis:

| | |
|---|---|
| $P_2O_5$ | 50.8% |
| Cl | 5.8% |
| Fe | 1.35% |
| Zn | 15.6% |
| Cd | 2.07% |

After removal of the Cd precipitate, the sump solution showed the following analysis:

| | |
|---|---|
| $P_2O_5$ | 52.6% |
| Cl | 4.60% |
| Fe | 1.40% |
| Zn | 16.12% |
| Cd | 60 ppm |

From this, a Cd removal of 99.7% may be calculated.

The proportional amount of filter-moist Cd precipitate filtered off was 2.58 kg/h, the $CdCl_2$ content being 33.4%. The filter-moist precipitate was thoroughly blended with 2.0 kg of caustic lime and transported to the deposit as a dry blend. The sump solution, freed from precipitated Cd compound, was fed into the stream of crude phosphoric acid.

It will be understood that each of the steps, conditions and reagents described above, or two or more together, may also find a useful application in other types of reactions, processing procedures and products differing from the types described above.

While the invention has been illustrated and described as embodied in the context of an improved process for the removal of cadmium ions from phosphoric acid resulting from a wet process, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A process for the removal of cadmium ions from wet process phosphoric acid by liquid-liquid extraction, comprising contacting the wet process phosphoric acid with at least one salt present in an organic solvent, where the organic solvent is immiscible with water, aqueous salt solutions, and aqueous acids, and wherein the salt is selected from salts of organic primary, secondary, and tertiary amines and quaternary ammonium salts; and separating the organic solvent phase, containing the extracted cadmium ions, from the wet process phosphoric acid;

said amine and ammonium salts, respectively, being salts which, as anions, contain chlorocomplexes of one or several polyvalent metals different from cadmium.

2. The process of claim 1, further comprising reextracting the extracted cadmium ions from the isolated organic phase with an acidic aqueous solution.

3. The process of claim 2, further comprising subsequent processing of the resulting acidic aqueous reextract solution enriched in cadmium ions.

4. The process according to claim 2, wherein the acidic aqueous solution used for reextraction contains anionic chlorocomplexes of one or several polyvalent metals different from cadmium, and further comprising recirculating the organic solvent phase after reextraction to the extraction process.

5. The process according to claim 1, wherein the chlorocomplexes of polyvalent metals are chlorocomplexes of iron(III).

6. The process according to claim 1, wherein the chlorocomplexes of polyvalent metals are chlorocomplexes of zinc(II).

7. The process according to claim 2, wherein the chlorocomplexes used in the aqueous solution during the reextraction are the same as the chlorocomplexes used in the organic solvent phase during the extraction.

8. The process according to claim 1, wherein the amine and ammonium cations, respectively, contain hydrocarbon radicals of 1 to 30 carbon atoms, where said hydrocarbon radicals may have desired chain length values.

9. The process according to claim 8, wherein the number of carbon atoms contained in the hydrocarbon radicals is from 1 to 18 carbon atoms.

10. The process according to claim 8, wherein the hydrocarbon radicals are alkyl radicals, and where at least one of the radicals attached to the nitrogen atom contains at least 6 carbon atoms.

11. The process according to claim 10, wherein the number of carbon atoms contained in one of the radicals attached to the nitrogen atom is at least 8 carbon atoms.

12. The process according to claim 8, wherein the hydrocarbon radicals are aralkyl radicals, and where at least one of the radicals attached to the nitrogen atom contains at least 6 carbon atoms.

13. The process according to claim 12, wherein the number of carbon atoms contained in one of the radicals attached to the nitrogen atom is at least 8 carbon atoms.

14. The process according to claim 2, wherein the acidic aqueous solution for the reextraction of the cadmium ions from the organic phase has a total chloride content of 2 to 58 weight-percent.

15. The process according to claim 14, wherein the total chloride content amounts to 3 to 40 weight-percent.

16. The process according to claim 2, wherein the acidic aqueous solution for the reextraction of the cadmium ions from the organic phase has a content of hydrochloric acid of 2 to 32 weight-percent.

17. The process according to claim 2, wherein the acidic aqueous solution for the reextraction of the cadmium ions from the organic phase has a content of iron ions of 0.01 to 24 weight-percent.

18. The process according to claim 17, wherein the content of iron ions amounts to from 0.05 to 10 weight-percent.

19. The process according to claim 2, wherein the acidic aqueous solution for the reextraction of the cadmium ions from the organic phase has a content of zinc ions of 0.01 to 38 weight-percent.

20. The process according to claim 19, wherein the content of zinc ions amounts to from 0.05 to 10 weight percent.

21. The process according to claim 2, wherein the acidic aqueous solution for the reextraction of the cadmium ions from the organic phase has a content of iron ions and of zinc ions each of 0.01 to 8 weight-percent.

22. The process according to claim 21, wherein the content of iron ions and of zinc ions each amount to from 0.05 to 4 weight-percent.

23. The process according to claim 3, comprising
largely removing the free hydrochloric acid, by physical separation methods, from the acidic aqueous solution which is obtained after reextraction and which is enriched with cadmium;
concentrating the remaining solution;
cooling the remaining solution; removing the resulting cadmium-containing precipitate; and
adding the filtrate to the crude phosphoric acid to be subjected to the cadmium removal.

24. The process of claim 23, further comprising recirculating to the extraction stage said removed free hydrochloric acid.

25. The process of claim 23, further comprising recirculating to the reextraction stage said removed free hydrochloric acid.

26. The process according to claim 23, wherein the removal of hydrochloric acid is effected by distillation.

27. The process according to claim 26, wherein 80 to 100 weight-percent of the hydrochloric acid, originally present in the acidic aqueous solution, are removed.

28. The process according to claim 27, wherein the amount of removed hydrochloric acid amounts to 95 to 100 weight-percent.

29. The process according to claim 27, wherein the hydrochloric acid is removed as an azeotropic HCl/H$_2$O mixture using a multistage distillation.

30. The process according to claim 27, wherein the hydrochloric acid is removed as an azeotropic HCl/H$_2$O mixture using a two-stage distillation.

31. The process according to claim 23, further comprising
concentrating the solution remaining after the removal of hydrochloric acid, where a P$_2$O$_5$-concentration amounts to 40 to 60 weight-percent, and where a concentration of chloride ions can amount to 0.5 to 8.0 weight-percent.

32. The process according to claim 31, wherein the P$_2$O$_5$-concentration amounts to 45 to 57 weight-percent and wherein the concentration of chloride ions amounts to 1.0 to 6.0 weight-percent.

33. The process according to claim 31, wherein the concentration is carried out in connection with the distillation of HCl.

34. The process according to claim 33, wherein at least part of the distillates of hydrochloric acid and water is recirculated to the extraction and reextraction stage.

35. Process for the removal of cadmium ions from wet process phosphoric acid by liquid-liquid extraction in which the wet process phosphoric acid is contacted with at least one salt present in an organic solvent which is immiscible with water, aqueous salt solutions and aqueous acids which salt is selected from salts of organic primary, secondary and tertiary amines and quaternary ammonium salts, and the organic solvent phase containing the extracted cadmium ions is separated from the wet process phosphoric acid, wherein the above amine and ammonium salts, respectively, are those containing chlorocomplexes of one or more polyvalent metals different from cadmium as anions.

36. The process of claim 35, wherein the extracted cadmium ions present in the separated organic solvent phase are reextracted from the isolated organic phase with an acidic aqueous solution.

37. The process of claim 36, wherein the resulting acidic aqueous reextract solution enriched in cadmium ions is subsequently processed.

38. Process according to claim 36,
wherein the acidic aqueous solution used for reextraction contains anionic chlorocomplexes of a polyvalent metal different from cadmium;
wherein the chlorocomplexes of polyvalent metals are a material selected from the group consisting of iron(III) and zinc (II);
wherein the chlorocomplexes used in the aqueous solution during the reextraction are the same as the chlorocomplexes used in the organic solvent phase during the extraction;
wherein a material selected from the group consisting of the amine and ammonium cations contains hydrocarbon radicals of 1 to 30 carbon atoms, which radicals may have desired chain length values; and
wherein the hydrocarbon radicals include a material selected from the group consisting of alkyl and aralkyl radicals, and at least one of the radicals attached to the nitrogen atom contains at least 6 carbon atoms.

39. The process according to claim 38, wherein the number of carbon atoms contained in the hydrocarbon radicals is from 1 to 18 carbon atoms, and wherein the number of carbon atoms contained in the nitrogen atom is at least 8 carbon atoms.

40. The process of claim 38, wherein the organic solvent phase, after reextraction, is recirculated to the extraction process.

41. Process according to claim 36, wherein the acidic aqueous solution for the reextraction of the cadmium ions from the organic phase has a total chloride content of 2 to 58 weight-percent, and wherein the acidic aqueous solution for the reextraction of the cadmium ions from the organic phase has a content of hydrochloric acid of 2 to 32 weight-percent.

42. Process according to claim 41, wherein the acidic aqueous solution has a total chloride content of 3 to 40 weight-percent.

43. Process according to claim 36,
wherein from the acidic aqueous solution which is obtained after reextraction and which is enriched with cadmium the free hydrochloric acid is largely removed by physical separation methods, the remaining solution is concentrated, and the resulting cadmium-containing precipitate is removed,
wherein the removal of hydrochloric acid is effected by distillation;
wherein 80 to 100 weight-percent of the hydrochloric acid originally present in the acidic aqueous solution are removed; and
wherein the hydrochloric acid is removed as an azeotropic $HCl/H_2O$ mixture using a suitably multi-stage, preferably two-stage, distillation.

44. Process according to claim 43, wherein the acidic aqueous solution for the reextraction of the cadmium ions from the organic phase shows a content of iron ions of 0.01 to 24 weight-percent.

45. Process according to claim 44, wherein the content of iron ions amounts to 0.05 to 10 weight-percent.

46. Process according to claim 43, wherein the acidic aqueous solution for the reextraction of the cadmium ions from the organic phase shows a content of zinc ions of 0.01 to 38 weight-percent.

47. Process according to claim 46, wherein the content of zinc ions amounts to 0.05 to 10 weight-percent.

48. Process according to claim 43, wherein the acidic aqueous solution for the reextraction of the cadmium ions from the organic phase shows a content of iron ions and of zinc ions each of 0.01 to 8 weight-percent.

49. Process according to claim 48, wherein the content of iron ions and of zinc ions each amounts to 0.05 to 4 weight-percent.

50. Process according to claim 43, wherein the amount of the removed hydrochloric acid is 95 to 100 weight-percent.

51. The process of claim 43, wherein the removed free hydrochloric acid is recirculated to the extraction stage.

52. The process of claim 43, wherein the removed free hydrochloric acid is recirculated to the reextraction stage.

53. The process of claim 43, wherein the solution remaining after free hydrochloric acid removal is cooled.

54. The process of claim 43, wherein the filtrate resulting from the removal of said cadmium-containing precipitate is added to the crude phosphoric acid to be subjected to cadmium removal.

55. Process according to claim 43,
wherein the solution remaining after the removal of hydrochloric acid is concentrated;
wherein the concentration is carried out in connection with the distillation of HCl; and
wherein at lest part of the distillates is recirculated to the extraction stage.

56. Process according to claim 55, wherein the remaining solution if concentrated to have a $P_2O_5$-concentration of 40 to 60 weight-percent.

57. Process according to claim 56, wherein the remaining solution is to have a $P_2O_5$-concentration of 45 to 57 weight-percent.

58. Process according to claim 55, wherein the remaining solution is to have a concentration of chloride ions of 0.5 to 8.0 weight-percent.

59. Process according to claim 58, wherein the remaining solution is to have a concentration of chloride ions of 1.0 to 6.0 weight-percent.

60. Process according to claim 55, wherein the distillates are hydrochloric acid.

61. Process according to claim 55, wherein the distillates are water.

62. Process according to claim 55, wherein at least part of the distillates is recirculated to the reextraction stage.

* * * * *